United States Patent
Higgins et al.

(10) Patent No.: US 9,836,037 B2
(45) Date of Patent: Dec. 5, 2017

(54) MANAGING POWER EMISSION TO ELECTRICAL APPLIANCES

(71) Applicant: INTERNATIONAL BUSINESS MACHINES CORPORATION, Armonk, NY (US)

(72) Inventors: ChunHui Y. Higgins, Raleigh, NC (US); William P. Higgins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 13/659,626

(22) Filed: Oct. 24, 2012

(65) Prior Publication Data

US 2014/0111028 A1 Apr. 24, 2014

(51) Int. Cl.
*G05B 19/042* (2006.01)

(52) U.S. Cl.
CPC ......... *G05B 19/042* (2013.01); *Y10T 307/826* (2015.04)

(58) Field of Classification Search
CPC .................................................... G05B 19/042
See application file for complete search history.

(56) References Cited

U.S. PATENT DOCUMENTS

| | | | | |
|---|---|---|---|---|
| 7,695,310 B1* | 4/2010 | Boyer | ................. | H01R 13/641 439/188 |
| 8,514,085 B2* | 8/2013 | Nelson | ................... | F16P 3/142 340/573.1 |
| 2005/0184856 A1* | 8/2005 | Pourchot | ................. | H04M 1/67 340/5.61 |
| 2006/0238293 A1* | 10/2006 | Mirho | ................... | H02J 13/002 340/5.2 |
| 2008/0309313 A1* | 12/2008 | Farrar | ..................... | G06F 1/266 323/351 |
| 2011/0207347 A1* | 8/2011 | Tsuruta | .................. | H01R 13/44 439/133 |

FOREIGN PATENT DOCUMENTS

| | | |
|---|---|---|
| DE | 102010041760 A1 | 1/2012 |
| JP | 2006279650 A | 10/2006 |

OTHER PUBLICATIONS

Helal et al, "The Gator Tech Smart House: A Programmable Pervasive Space", published by the IEEE Computer Society, pp. 50-60, Mar. 2005.

(Continued)

*Primary Examiner* — Daniel Kessie
(74) *Attorney, Agent, or Firm* — Francis Lammes; Stephen J. Walder, Jr.; Richard A. Wilhelm (57) ABSTRACT

A method, system or computer usable program product for controlling power emission from a socket to a plug including providing a first unit connected to the socket with full power emission disabled and a second unit connected to the plug, each unit with a signal generation capability, establishing a handshake protocol between the first and second units, and responsive to a successful handshake protocol between the first and second units, the first unit enabling full power emission from the socket to the plug.

18 Claims, 8 Drawing Sheets

(56) References Cited

OTHER PUBLICATIONS

"Child Outlet Safety Code Requirements", 2011, National Electrical Manufacturers Association (NEMA), published on the world wide web at http://www.childoutletsafety.org/code_requirement.html.
"Remotely Control You Wall Outlet!", 2012, X10.com, published on the world wide web at: http://www.x10.com/promotions/sr227_cat_hm.html?NCAT.
"Smarthome", 2012, Smarthome.com, published on the world wide web at: http://www.smarthome.com/2473SWH/OutletLinc-Relay-INSTEON-Remote-Control-On-Off-Outlet-Non-Dimming-White/p.aspx.

* cited by examiner

MANAGING POWER EMISSION TO ELECTRICAL APPLIANCES

BACKGROUND

1. Technical Field

The present invention relates generally to managing power supplied to an appliance, and in particular, to a computer implemented method for deterministically providing power emission to an electrical appliance.

2. Description of Related Art

Alternating current power plugs and sockets allow electrical appliances to be connected to an alternating current (AC) power supply such as in a building. Generally the plug is the mobile connector attached by wire to an electrical appliance and the socket is affixed to a wall of an extension cord. Standards for AC plugs and sockets vary worldwide, but generally the plug has two or three male contacts while sockets have two or three contacts. The plug contacts may be prongs, blades, or pins that fit into matching slots or holes in the socket. If there are two contacts, generally one is hot and will shock anyone grounded touching that contact, while and the other contact is neutral. Often there is a third contact which is generally ground.

To reduce the risk of electric shock, various safety features are built into plug and socket systems. For example, sockets are designed structurally to prevent the insertion of objects other than a compatible plug. However, often other types of objects such as a fork may be inserted into a socket. This may result in an injurious shock to the person doing so, which is often a young child. Various types of other approaches have been utilized to prevent such occurrences including shutters to block insertion of objects other than compatible plugs.

SUMMARY

The illustrative embodiments provide a method, system, and computer usable program product for controlling power emission from a socket to a plug including providing a first unit connected to the socket with full power emission disabled and a second unit connected to the plug, each unit with a signal generation capability, establishing a handshake protocol between the first and second units, and responsive to a successful handshake protocol between the first and second units, the first unit enabling full power emission from the socket to the plug.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized to deterministically provide power emission to an electrical appliance. These processes and apparatuses may be implemented and utilized as will be explained with reference to the various embodiments below.

Figure 1:
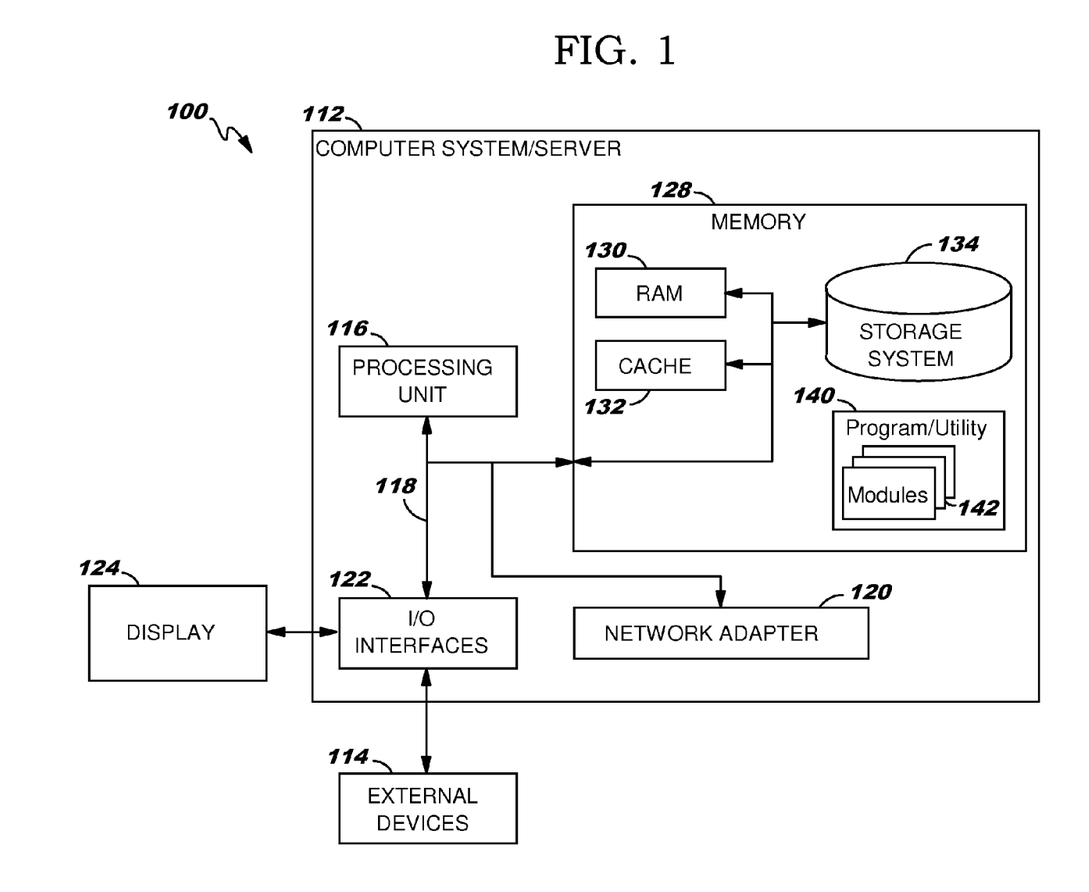
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for deterministically providing full power to an electrical appliance.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
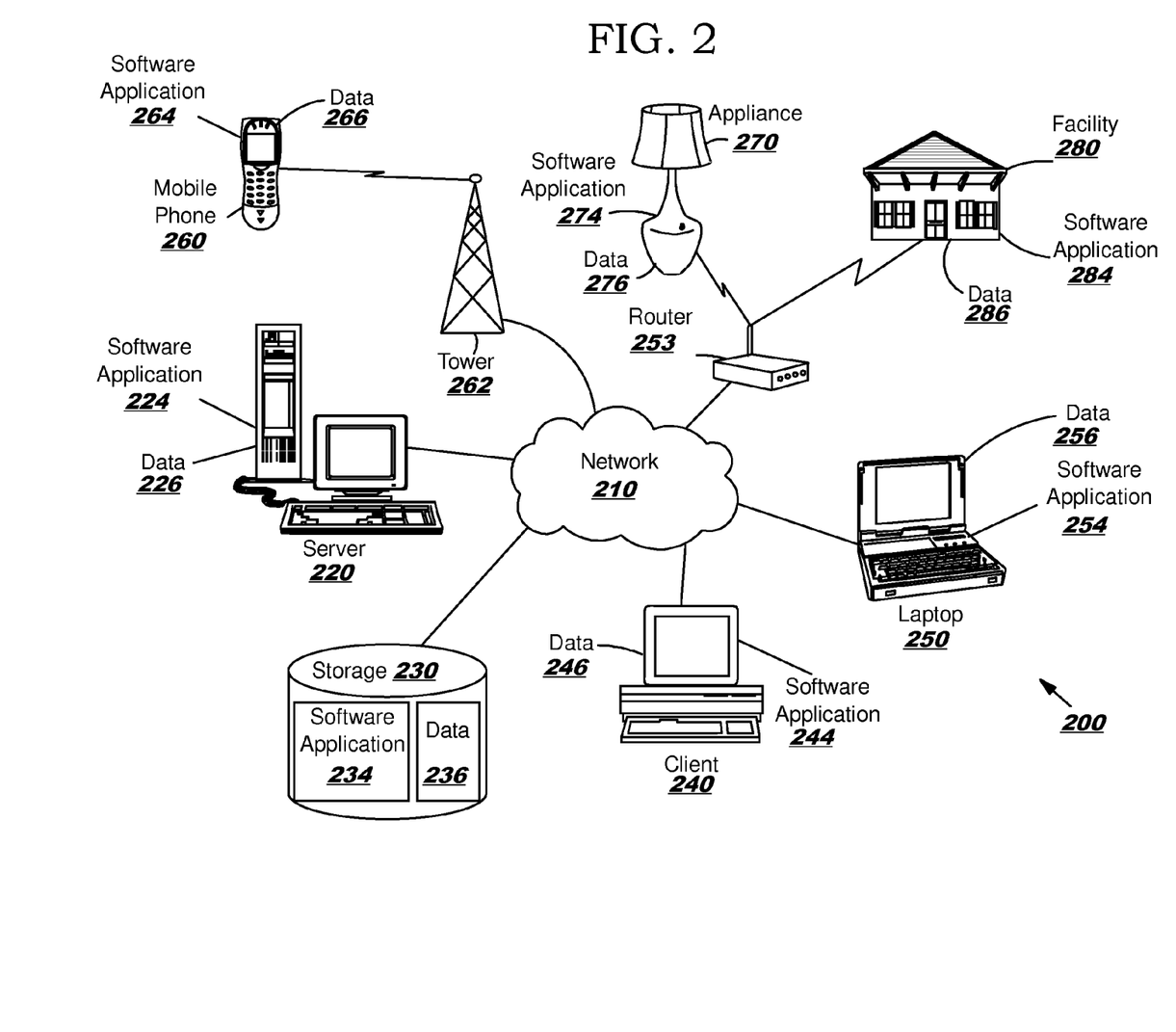
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, electrical appliance 270, and facility 280 (such as a home or business) are coupled to network 210 including wirelessly such as through a network router 253. Alternatively, electrical appliance 270 and facility 280 may be coupled to network 210 through standard electrical power wiring. A mobile phone 260 may be coupled to network 210 through a mobile phone tower 262. Data processing systems, such as server 220, client 240, laptop 250, mobile phone 260, electrical appliance 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for deterministically providing power to an electrical appliance or other software applications and data in accordance with embodiments described herein. Storage 230 may contain software application 234 and a content source such as data 236 for identifying a compatible electrical appliance. Other software and content may be stored on storage 230 for sharing among various computer or other data processing devices. Client 240 may include software application 244 and data 246. Laptop 250 and mobile phone 260 may also include software applications 254 and 264 as well as data 256 and 266. Electrical appliance 270 and facility 280 may include software applications 274 and 284 as well as data 276 and 286. Other types of data processing systems coupled to network 210 may also include software applications. Software applications could include a web browser, email, or other software application that can deterministically provide full power to an electrical appliance.

Server 220, storage unit 230, client 240, laptop 250, mobile phone 260, electrical appliance 270, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, electrical appliance 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
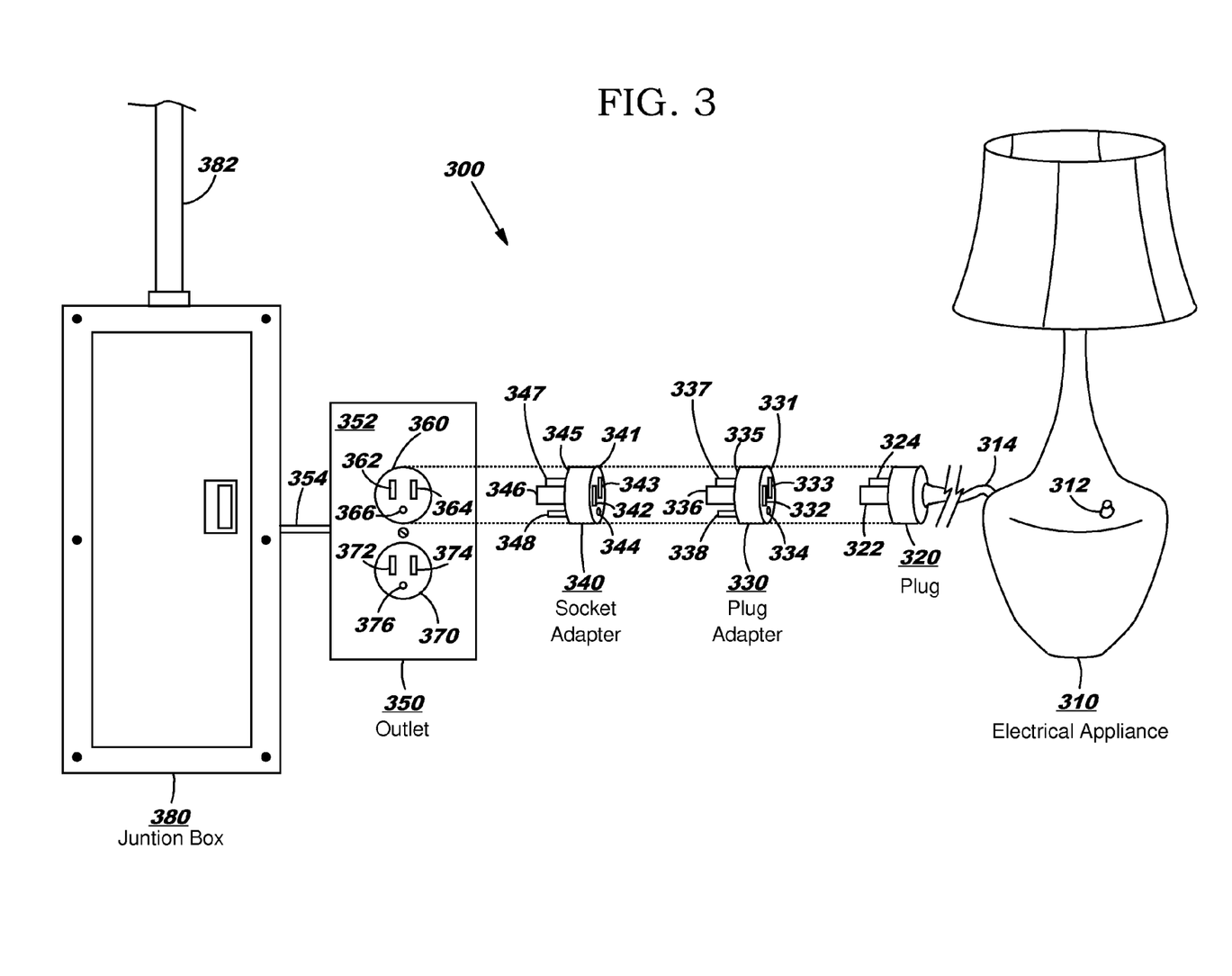
FIG. 3 is a diagram of a system for providing AC power to an electrical appliance in which various embodiments may be implemented.

FIG. 3 is a diagram of a system for providing AC power to an electrical appliance in which various embodiments may be implemented. For illustrative purposes, this diagram is not to scale. Although this diagram illustrates a plug and socket in conformance with the North American NEMA standard, the principles described could easily be applied to other types of plugs and sockets by one of ordinary skill in the art.

This electrical system 300 includes an electrical appliance 310 with a plug 320, an optional plug adapter 330, an optional socket adapter 340, and an outlet 350 powered by a junction box 380. In this example, electrical appliance 310 is a lamp having a switch 312 and is connected to plug 320 with a wire or cord 314. Switch 312 is for turning on a light within the lamp. Plug 320 is a two prong plug with a hot prong or blade 322 and a neutral prong or blade 324. Alternatively, plug 320 may have a third prong known as a ground prong. Electrical appliance 310 may be any electrical device that needs to be powered through an AC electrical system such as shown herein.

Plug adapter 330 is an optional adapter for use with electrical appliances that do not have the capabilities described herein. Plug adapter 330 may also be built onto or in an electrical appliance plug at the factory so that the adapter cannot be easily removed and so that the electrical appliance utilizes the capabilities of these embodiments from the factory, possibly as a new model of the electrical appliance. Plug adapter 330 provides backwards compatibility for appliances that may not have the desired capabilities. Plug adapter 330 includes a socket 331 suitable for insertion of plug 320 or an alternative three prong plug. This includes a hot insert 332, neutral insert 333 and ground insert 334. Plug adapter 330 may also be surely attached to plug 320 such as with a cable tie to prevent easy removal from the plug. Plug adapter 330 also includes a plug 335 suitable for inserting into an outlet. This includes a hot prong or blade 336, neutral prong or blade 337 and ground prong or blade 338. Not shown in this diagram but shown below is circuitry within plug adapter 330 connecting the various elements of socket 331 and plug 335.

Socket adapter 340 is an optional adapter for use with outlets and sockets that do not have the capabilities described herein. Socket adapter 340 may also be built onto or in an outlet or socket at the factory so that the adapter cannot be easily removed and so that the outlet or socket utilizes the capabilities of these embodiments from the factory, possibly as a new model of the outlet. Socket adapter 340 provides backwards compatibility for outlets that may not have the desired capabilities. Socket adapter 340 includes a socket 341 suitable for insertion of plug 320, plug adapter 330 or an alternative three prong plug. This includes a hot insert 342, neutral insert 343 and ground insert 344. Socket adapter may also be securely attached to outlet 350 such as with a cable tie or plate to prevent easy removal from the socket or outlet. For example, two socket adapters may be contained within a box-like face plate that plugs into a wall outlet with the box-like faceplate containing the socket adapters and replacing the faceplate of the wall outlet. Socket adapter 340 also includes a plug 345 suitable for inserting into a socket. This includes a hot prong or blade 346, neutral prong or blade 347 and ground prong or blade 348. Not shown in this diagram but shown below is circuitry within socket adapter 340 connecting the various elements of socket 341 and plug 345.

Outlet 350 is typically located in the wall or may be located at the end of an extension cord or a power strip. Outlet 350 is used to provide AC power to electrical appliances. Outlet 350 has a faceplate 352 and sockets 360 and 370. Each socket has a hot insert 362 and 372, neutral insert 364 and 374, and ground insert 366 and 376. Plugs can be plugged into either socket for power. Outlet 350 also has a wire 354 for connecting to junction box 380. Not shown in this diagram but shown below is circuitry within outlet 350 connecting the various elements of sockets 360 and 370 with wire 354. Also not shown are other outlets or electrical devices connected to wire 354.

Junction box 380 provides power to multiple circuits, each circuit having up to several outlets including through wire 354. Junction box receives power from an external source such as a power station through wire 382. Not shown in this diagram is circuitry within junction box 380 connecting wire 354 with wire 382 as well as other wires and outlets.

Outlet 350 may also be coupled to a network or internet for communications. For example, a user may instruct the outlet to implement the use of the embodiments described herein or to not implement the use of those embodiments. For example, if no children are present, the homeowner may wish to temporarily disable to capabilities described herein.

Figure 4:
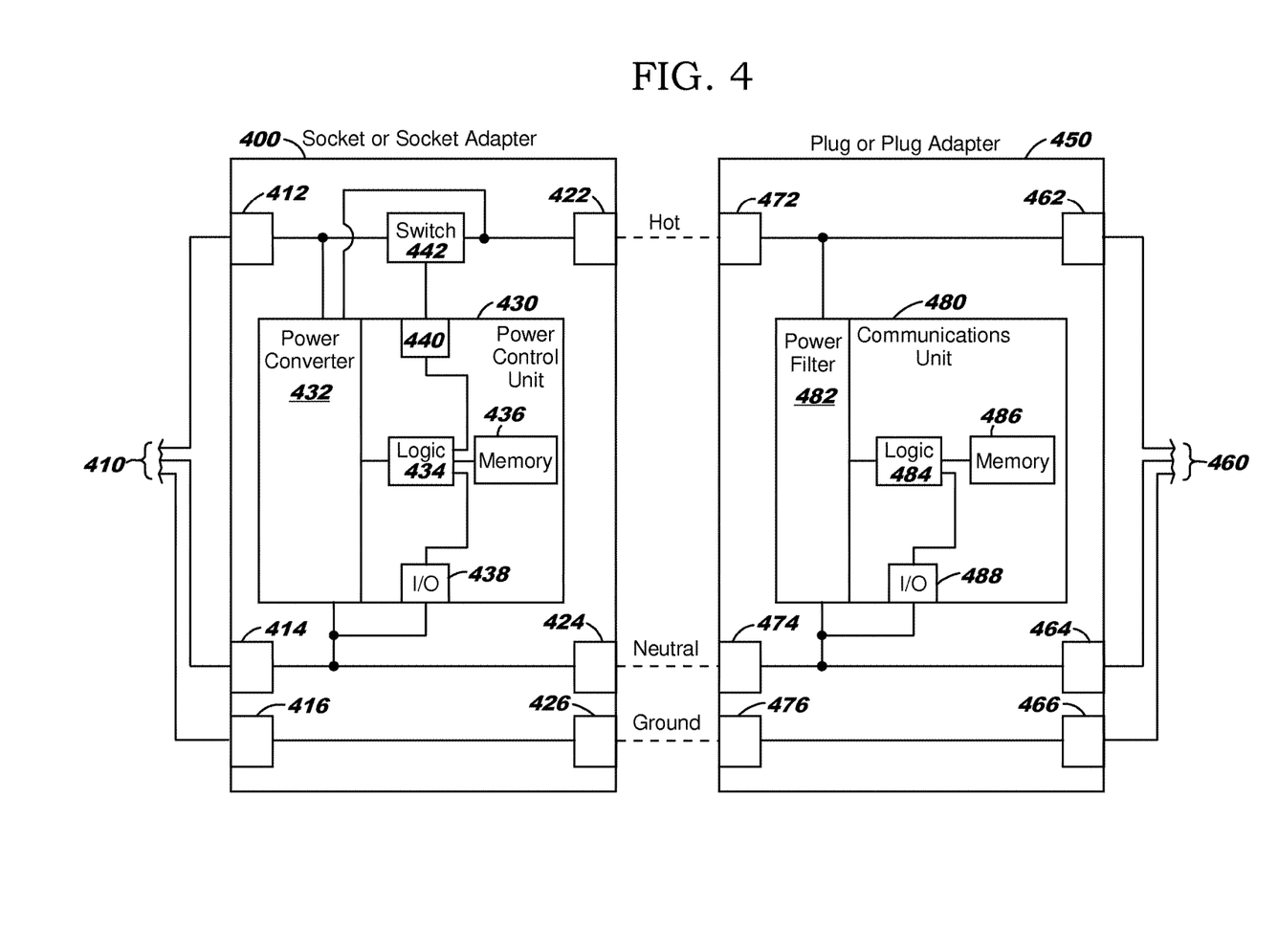
FIG. 4 is a block diagram of a socket unit and plug unit in accordance with a first embodiment.

FIG. 4 is a block diagram of a socket or socket adapter 400 referred to herein as a socket unit and a plug or plug adapter 450 referred to herein as a plug unit in accordance with a first embodiment. The socket unit may be incorporated into a wall outlet, an extension cord, a power strip, or other locations where electrical appliances may be plugged into for AC power. Socket unit 400 is connected to an AC current source such as a junction box through wire 410. Wire 410 connects to the hot wire connector 412, neutral wire connector 414 and ground wire connector 416. Ground wire connector 416 is connected with ground wire connector 426 suitable for the ground wire prong of a plug unit. Neutral wire connector 414 is connected with neutral wire connector 424 suitable for the neutral wire prong of a plug unit. Hot wire connector 412 is connected through a switch 442 with hot wire connector 422 suitable for the hot wire prong of a plug unit.

A power control unit 430 is connected to hot wire connectors 412 and 422, neutral wire connectors 414 and 424, and switch 442. Power control unit 430 includes a power converter 432, logic circuitry 434, memory 436, input/output (I/O) interface 438 and switch control unit 440. Power converter 432 is connected to hot wire connector 412 and neutral wire connector 414 for receiving and converting power for the use of the various elements of the power control unit including communications with plug unit 450. Power converter 432 is also connected to hot wire connector 422 as well as neutral wire connector 424 for providing sufficient preferably DC (direct current) voltage and current (power) for plug unit 450 to respond to an inquiry from power control unit 430. This DC voltage and current is sufficient to power the plug communications unit but not sufficient to power the electrical appliance or unduly shock a person. Logic circuitry 434 manages the operations of the power control unit. Logic circuitry 434 may be a processor or more simple hardwired logic. Memory 436 is coupled to logic circuitry 434 and may be included for storing information needed by the logic circuitry. I/O interface 438 is connected to logic circuitry 434 and to neutral wire connectors 414 and 424. I/O interface 438 manages the communications with plug unit 450. In an alternative embodiment, I/O interface 438 may be connected to hot wire connector 422. Switch control unit is connected to logic circuitry 434 and to switch 442. At the instruction of logic circuitry 434, switch control unit 440 can turn the switch on or off, thereby allowing full power to flow through hot wire connector 412 to hot wire connector 422 or not, thereby powering or suspending power to plug unit 450. Full power is the power needed to power appliances plugged into the socket or socket adapter 400. This is the power received across wire 410 less any parasitic resistance or other minor loss of power by the operation of socket or socket adapter 400.

Plug unit 450 is connected to an electrical appliance such as a lamp or microwave through wire 460. Wire 460 connects to the hot wire connector 462, neutral wire connector 464 and ground wire connector 466. Ground wire connector 466 is connected with ground wire prong 476 suitable for insertion into a ground wire insert of a socket unit. Neutral wire connector 464 is connected with neutral wire prong 474 suitable for insertion into a neutral wire insert of a socket unit. Hot wire connector 462 is connected with hot wire prong 472 suitable for insertion into a hot wire insert of a socket unit.

A communications unit 480 is connected to hot wire prong 472 and neutral wire prong 474. Communications unit 480 includes a power filter 482, logic circuitry 484, memory 486 and input/output (I/O) interface 488. Power filter 482 is connected to hot wire connector 472 and neutral wire connector 474 for receiving and filtering power (DC or AC) for the use of the various elements of the communications unit including communications with socket unit 400. Power filter 482 is able to receive a low power current from power control unit 430 when the socket unit is off and also filter power from hot wire prong 472 and neutral wire prong 474 when the socket unit is on. Logic circuitry 484 manages the operations of the power control unit. Logic circuitry 484 may be a processor or more simple hardwired logic. Memory 486 is coupled to logic circuitry 484 and may be included for storing information needed by the logic circuitry. I/O interface 488 is connected to logic circuitry 484 and to neutral wire connectors 466 and 476. I/O interface 488 manages the communications with socket unit 400. In an alternative embodiment, I/O interface 488 may be connected to hot wire connector 472. In the case of a reversible plug, I/O interface 488 may be connected to both neutral wire connector 474 and hot wire connector 472. Communications unit 480 may be located within the plug unit of an electrical appliance, but it may also be included within a switch or elsewhere within the electrical appliance.

In an alternative embodiment, two or more socket units may be coupled together utilized for a single wall outlet. In such a case, the multiple socket units may share common circuitry for managing the various sockets. That is, one set of common circuitry may be utilized to collectively or individually determine whether an appropriate electrical appliance is plugged into each socket.

Figure 5A:
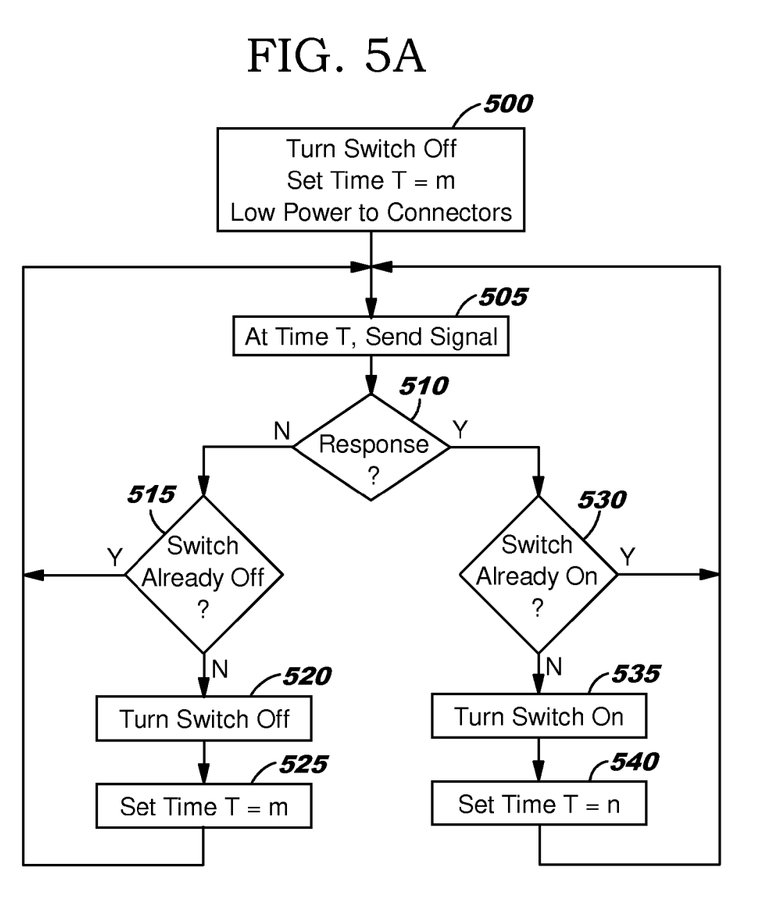
FIGS. 5A and 5B are flow diagrams of the operation of the power control unit and the communications unit in accordance with the first embodiment.
Figure 5B:
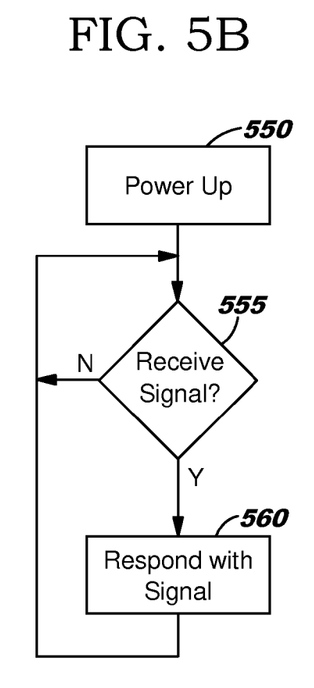

FIGS. 5A and 5B are flow diagrams of the operation of the power control unit and the communications unit in accordance with the first embodiment. FIG. 5A is a flow diagram of the operation of the power control unit of a socket unit. In a first step 500, the switch is turned off, time T is set to m where m is equal to a short time period such as one second, and the hot and neutral wires (where a plug unit would attach) are charged with sufficient preferably DC voltage and current to power a plug communications unit. M is set for a short time period because when a person plugs an appliance into the socket unit, they would expect that appliance to receive power immediately. This DC voltage and current is sufficient to power the plug communications unit but not sufficient to power the electrical appliance or unduly shock a person. In step 505, a handshake protocol in initiated by sending a signal at time T across the neutral wire for reception by a plug communications unit. The signal may be a simple pulse or a more complex digital signal. Subsequently in step 510 it is determined whether there is a valid response to the signal. The response by the plug unit may be in the form of a simple pulse or a more complex digital signal such as a hashed form of the original signal sent by the socket unit. If no valid signal was received, then there is an unsuccessful handshake protocol indicating that no electrical appliance is plugged into the socket unit and processing continues to step 515, otherwise there is a successful handshake protocol indicating that an electrical appliance is plugged into the socket and processing continues to step 530.

In step 515, it is determined whether the switch is already turned off indicating that no electrical appliance is plugged into the socket unit. If yes, then processing returns to step 505 as no action is needed given the switch is already off. If no in step 515, then processing continues to step 520. In step 520, the switch is turned off thereby preventing AC power from reaching the socket unit hot wire connector. Subsequently in step 525, time T is set equal to m where m is a short time period. Processing then returns to step 505.

In step 530, it is determined whether the switch is already tuned on indicating that the socket unit is already conducting full power to an electrical appliance. If yes, then processing returns to step 505 as no action is needed given the switch is already on. If no in step 530, then processing continues to step 535. In step 535, the switch is turned on thereby providing full (AC in this embodiment) power to the socket unit hot wire connector and powering a plugged in appliance. Subsequently in step 540, time T is set equal to n where n is a large time period such as 10 seconds. That is, once an electrical appliance has been plugged in, there is less need to frequently check whether that appliance is still plugged in. However, a child may pull the plug unit and stick an object into the socket unit within a certain time period, but that time period should be greater than n. Processing then returns to step 505.

FIG. 5B is a flow diagram of the operation of the communications unit of a plug unit. In a first step 550, the communications unit powers up based on the low preferably DC level voltage and current (power) provided by the socket unit. Subsequently in step 555 it is determined whether a signal has been received. If no, then processing returns to step 555 which is repeated until a signal is received. If yes in step 555, then in step 560 a response signal is generated and sent onto the neutral wire in response. The response may depend on the signal received. If a single pulse is received, then a single pulse may be returned. If a more complex digital signal is received, then a more complex digital signal may be sent in return. For example, a digital signal may be received from the socket unit, hashed (such as checksum), and the hashed digital signal is sent by the plug unit for verification by the socket unit. Processing then returns to step 555 where the communications unit awaits another signal.

Figure 6:
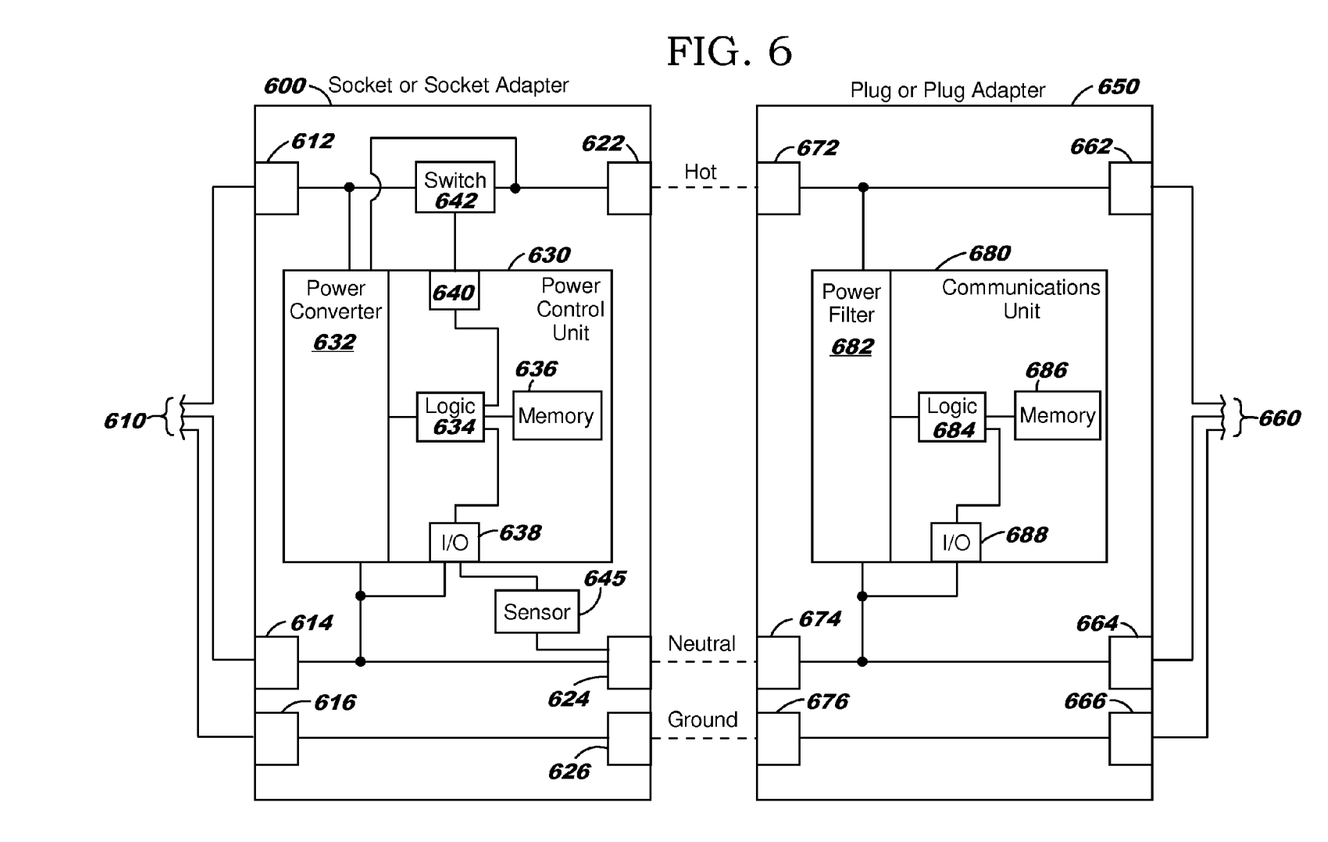
FIG. 6 is a block diagram of a socket unit and plug unit in accordance with a second embodiment.

FIG. 6 is a block diagram of a socket unit 600 and plug unit 650 in accordance with a second embodiment. The socket unit may be incorporated into a wall outlet, an extension cord, a power strip, or other locations where electrical appliances may be plugged into for AC power. Socket unit 600 is connected to an AC current source such as a junction box through wire 610. Wire 610 connects to the hot wire connector 612, neutral wire connector 614 and ground wire connector 616. Ground wire connector 616 is connected with ground wire connector 626 suitable for the ground wire prong of a plug unit. Neutral wire connector 614 is connected with neutral wire connector 624 suitable for the neutral wire prong of a plug unit. Hot wire connector 612 is connected through a switch 642 with hot wire connector 622 suitable for the hot wire prong of a plug unit.

A power control unit 630 is connected to hot wire connectors 612 and 622, neutral wire connectors 614 and 624, to switch 642 and sensor 645. Power control unit 630 includes a power converter 632, logic circuitry 634, memory 636, input/output (I/O) interface 638 and switch control unit 640. Power converter 632 is connected to hot wire connector 612 and neutral wire connector 614 for receiving and converting power for the use of the various elements of the power control unit including communications with plug unit 650. Power converter 632 is also connected to hot wire connector 622 as well as neutral wire connector 624 for providing sufficient power for plug unit 650 to respond to an inquiry from power control unit 630. Logic circuitry 634 manages the operations of the power control unit. Logic circuitry 634 may be a processor or more simple hardwired logic. Memory 636 is coupled to logic circuitry 634 and may be included for storing information needed by the logic circuitry. I/O interface 638 is connected to logic circuitry 634 and to neutral wire connectors 616 and 626. I/O interface 638 manages the communications with plug unit 650. In an alternative embodiment, I/O interface 638 may be connected to hot wire connector 622. Switch control unit is connected to logic circuitry 634 and to switch 642. At the instruction of logic circuitry 634, switch control unit 640 can turn the switch on or off, thereby allowing full power to flow through hot wire connector 612 to hot wire connector 622 or not, thereby powering or suspending power to plug unit 650. Full power is the power needed to power appliances plugged into the socket or socket adapter 600. This is the power received across wire 610 less any parasitic resistance or other minor loss of power by the operation of socket or socket adapter 600. Sensor 645 is connected to neutral wire connector 624 for sensing when a plug unit neutral prong 674 or other object has been inserted into or removed from neutral wire connector 624. Upon detection, a signal is sent to logic unit 634 through I/O interface 638. In an alternative embodiment, sensor 645 may be connected to hot wire connector 622.

Plug unit 650 is connected to an electrical appliance such as a lamp or microwave through wire 660. Wire 660 connects to the hot wire connector 662, neutral wire connector 664 and ground wire connector 666. Ground wire connector 666 is connected with ground wire prong 676 suitable for insertion into a ground wire insert of a socket unit. Neutral wire connector 664 is connected with neutral wire prong 674 suitable for insertion into a neutral wire insert of a socket unit. Hot wire connector 662 is connected with hot wire prong 672 suitable for insertion into a hot wire insert of a socket unit.

A communications unit 680 is connected to hot wire prong 672 and neutral wire prong 674. Communications unit 680 includes a power filter 682, logic circuitry 684, memory 686 and input/output (I/O) interface 688. Power filter 682 is connected to hot wire connector 672 and neutral wire connector 674 for receiving and filtering power for the use of the various elements of the communications unit including communications with socket unit 600. Power filter 682 is able to receive a low power current from power control unit 630 when the socket unit is off and also filter power from hot wire prong 672 and neutral wire prong 674 when the socket unit is on. Logic circuitry 684 manages the operations of the power control unit. Logic circuitry 684 may be a processor or more simple hardwired logic. Memory 686 is coupled to logic circuitry 684 and may be included for storing information needed by the logic circuitry. I/O interface 688 is connected to logic circuitry 684 and to neutral wire connectors 664 and 674. I/O interface 688 manages the communications with socket unit 600. In an alternative embodiment, I/O interface 688 may be connected to hot wire connector 672. In the case of a reversible plug, I/O interface 688 may be connected to both neutral wire connector 674 and hot wire connector 672. Communications unit 680 may be located within the plug unit of an electrical appliance, but it may also be included within a switch or elsewhere within the electrical appliance.

Figure 7A:
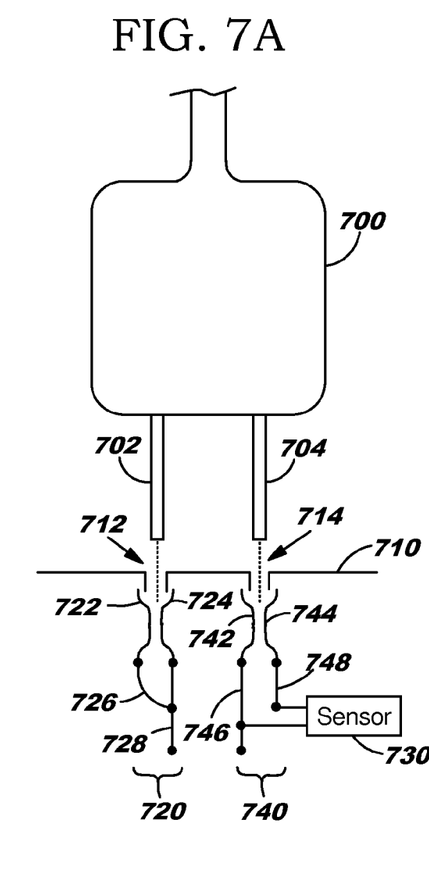
FIGS. 7A and 7B are diagrams of a socket unit with an insertion sensor in accordance with the second embodiment.
Figure 7B:
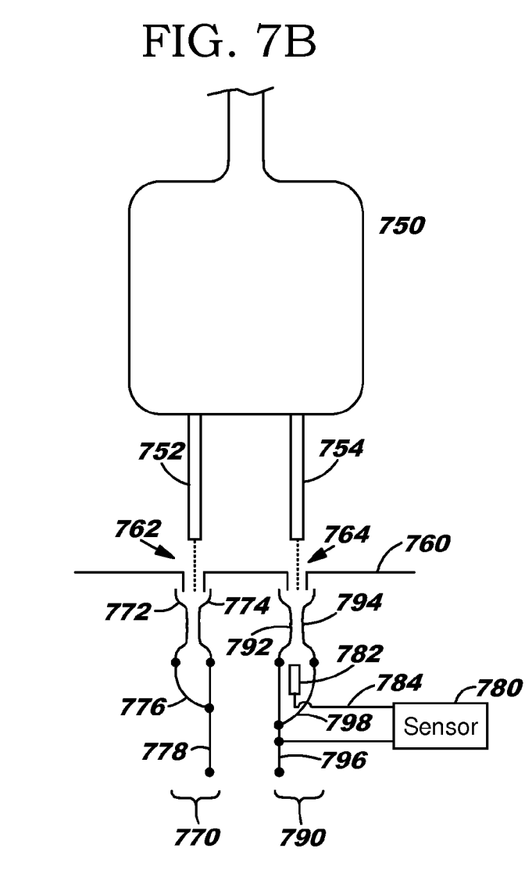

FIGS. 7A and 7B are diagrams of a socket unit with an insertion sensor in accordance with the second embodiment. FIG. 7A is a diagram of a first example of a socket unit with an insertion sensor. A plug unit 700 is shown with a hot wire prong 702 and a neutral wire prong 704. Plug unit 700 may be inserted or otherwise plugged into socket unit 710 through apertures 712 and 714. Upon insertion, hot wire prong will come into contact with socket assembly 720 including metal contacts 722 and 724. Metal contact 722 is connected to wire 726 and metal contact 724 is connected to wire 728 which also connects with wire 726. Wire 728 is then connected to a power source to provide power to prong 702 when it is inserted. Also upon insertion, neutral wire prong 704 will come in contact with socket assembly 740 including metal contacts 742 and 744. Metal contact 742 is connected to wire 746 and is also connected to a power source for providing power (as a ground) to prong 704 when it is inserted. Metal contact 744 is connected to wire 748. Wire 746 does not connect to wire 748. However, both wires are connected to insertion sensor 730. As a result, insertion sensor can detect the insertion of a plug unit 700 into socket unit 710 by the closed contact between metal plates 742 and 744 by neutral prong 704. A signal indicating whether an object has been inserted can be provided to the socket power control unit upon the detection of insertion. A signal indicating that an object has been removed can also be provided to the socket unit power control unit upon detection of the removal. No signal is sent if there is not a change of condition in this embodiment. In an alternative embodiment, insertion sensor may send a continuous signal indicating whether an object is inserted or not to the socket unit power control unit. In another alternative embodiment, insertion sensor 730 may be located on the hot socket assembly 720.

FIG. 7B is a diagram of a second example of a socket unit with an insertion sensor. A plug unit 750 is shown with a hot wire prong 752 and a neutral wire prong 754. Plug unit 750 may be inserted or otherwise plugged into socket unit 760 through apertures 762 and 764. Upon insertion, hot wire prong will come into contact with socket assembly 770 including metal contacts 772 and 774. Metal contact 772 is connected to wire 776, and metal contact 774 is connected to wire 778, which also connects with wire 776. Wire 778 is then connected to a power source to provide power to prong 752 when it is inserted. Also upon insertion, neutral wire prong 754 will come in contact with socket assembly 790 including metal contacts 792 and 794 and with metal pin 782. Metal contact 792 is connected to wire 796, and metal contact 794 is connected to wire 798, which is also connected to wire 796. Wire 796 is also connected to a power source for providing power (as a ground) to prong 754 when it is inserted. Sensor 780 is connected to wire 796 and to metal pin 782 through wire 784. As a result, insertion sensor can detect the insertion of a plug unit 750 into socket unit 760 by the closed contact between metal plate 792 (or metal plate 794) and metal pin 782 by neutral prong 754. A signal indicating whether an object has been inserted can be provided to the socket unit power control unit upon the detection of insertion. A signal indicating that an object has been removed can also be provided to the socket power control unit upon detection of the removal. No signal is sent if there is not a change of condition in this embodiment. In an alternative embodiment, insertion sensor may send a continuous signal indicating whether an object is inserted or not to the socket power control unit. In another alternative embodiment, insertion sensor 780 may be located on the hot socket assembly 770.

Although two examples are provided, one of ordinary skill in the art would be able to provide additional alternative examples suitable for detecting the insertion of an object into the socket unit.

Figure 8A:
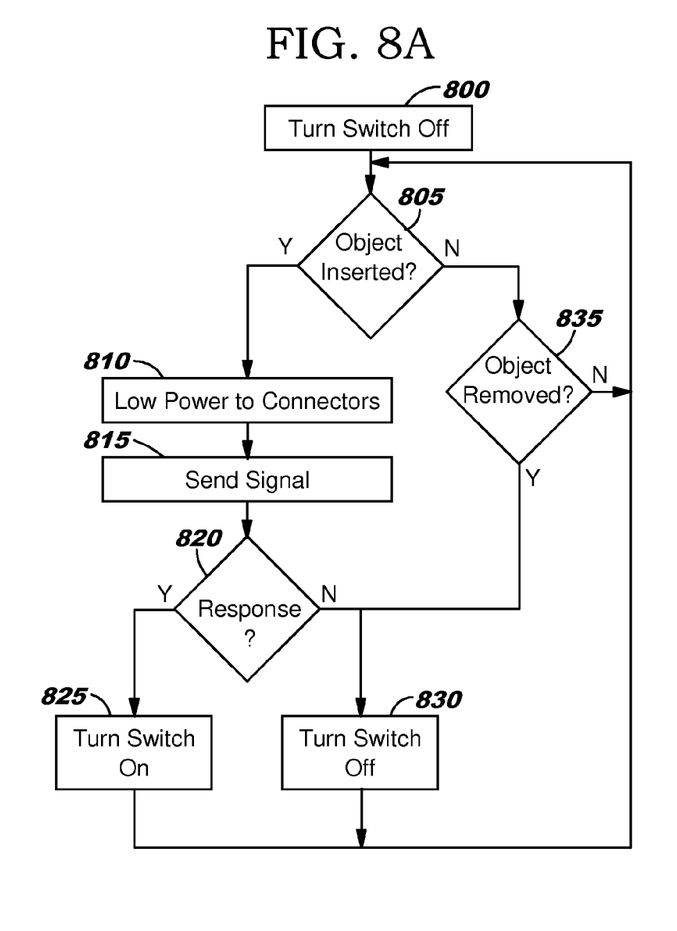
FIGS. 8A and 8B are flow diagrams of the operation of the power control unit and the communications unit in accordance with the second embodiment.
Figure 8B:
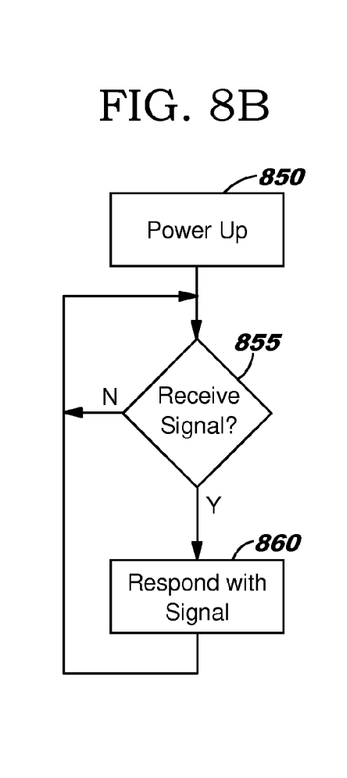

FIGS. 8A and 8B are flow diagrams of the operation of the power control unit and the communications unit in accordance with the second embodiment. FIG. 8A is a flow diagram of the operation of the power control unit of a socket unit. In a first step 800, the switch is turned off as the preferred setting. In step 805, it is determined whether the insertion sensor has detected the insertion of an object. If not, then processing continues to step 835, otherwise processing continues to step 810. In step 810 the hot and neutral wires (where a plug unit would attach) are charged with sufficient preferably DC voltage and current to power a plug communications unit. This DC voltage and current (power) is sufficient to power the plug communications unit but not sufficient to power the electrical appliance or unduly shock a person. Subsequently in step 815, a handshake protocol in initiated by sending a signal across the neutral wire for reception by a plug communications unit. The signal may be a simple pulse or a more complex digital signal. Subsequently in step 820 it is determined whether there is a valid response to the signal. The response by the plug unit may be in the form of a simple pulse or a more complex digital signal such as a hashed form of the original signal sent by the socket unit. If a valid signal was received, then there is a successful handshake protocol indicating that an electrical appliance is plugged into the socket unit and processing continues to step 825, otherwise there is an unsuccessful handshake protocol indicating that an electrical appliance is not plugged into the socket unit and processing continues to step 830. In step 825 the switch is turned on to provide full power (AC in this embodiment) to the electrical appliance and processing returns to step 805. In step 830, the switch is turned off and process returns to step 805. In step 835, it is determined whether an object was detected as being removed. If yes, then processing continues to step 830 to turn off the switch, otherwise processing returns to step 805.

FIG. 8B is a flow diagram of the operation of the communications unit of a plug unit. In a first step 850, the communications unit powers up based on the low level preferably DC voltage and current (power) is provided by the socket unit. Subsequently in step 855 it is determined whether a signal has been received. If no, then processing returns to step 855 which is repeated until a signal is received. If yes in step 855, then in step 860 a response signal is generated and sent onto the neutral wire in response. The response may depend on the signal received. If a single pulse is received, then a single pulse may be returned. If a more complex digital signal is received, then a more complex digital signal may be sent in return. For example, a digital signal may be received from the socket unit, hashed (such as checksum), and the hashed digital signal is sent by the plug unit for verification by the socket unit. Processing then returns to step 855 where the communications unit awaits another signal.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for deterministically providing power to an electrical appliance. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of controlling alternating current power from a socket to a plug coupled to a load comprising:
    providing a socket adapter with signal generation capability connected to the socket with alternating current (AC) power turned off at the socket by a switch via a switch control unit in a power control unit in the socket adapter;
    providing a plug adapter with signal generation capability connected to the plug;
    responsive to establishing a physical connection between the plug and the socket, the socket adapter and the plug adapter utilizing respective signal generation capabilities to establish a handshake protocol between the socket adapter and plug adapter across the established physical connection, wherein the socket adapter comprises a power converter of the power control unit for converting the AC power to a direct current (DC) power in response to the AC power being turned off by the switch, wherein, prior to performing the handshake protocol, the socket adapter provides the DC power across the established physical connection to power a communications unit in the plug adapter in order for the plug adapter to perform the handshake protocol; and
    responsive to a successful handshake protocol between the socket adapter and plug adapter, the switch control unit in the power control unit of the socket adapter instructing the switch to turn on AC power at the socket thereby providing AC power from the socket through the established physical connection to the connected plug.

2. The method of claim 1 wherein the handshake protocol includes the socket adapter sending a first electrical signal, the plug adapter detecting the first electrical signal, the plug adapter sending a second electrical signal in response to the first electrical signal, and the socket adapter detecting the second electrical signal.

3. The method of claim 2 wherein the second electrical signal is a hashed form of the first electrical signal and wherein the socket adapter verifies the second electrical signal as part of the handshake protocol.

4. The method of claim 1 wherein the DC power is not adequate to power an alternating current based electrical appliance, and wherein full (AC) power is turned on from the socket to the plug across the established physical connection by the switch in the socket adapter in response to a successful handshake protocol across the established physical connection.

5. The method of claim 4 wherein the plug is physically connected to the socket through the plug adapter; and wherein the electrical appliance does not have handshake protocol capability.

6. The method of claim 4 wherein the socket adapter is built into an AC (alternating current) based outlet containing the socket.

7. A data processing system for controlling power emission from a socket to a plug coupled to a load, the data processing system comprising:
   a processor; and
   a memory storing program instructions which when executed by the processor execute the steps of:
   providing a socket adapter with signal generation capability connected to the socket with alternating current (AC) power turned off at the socket by a switch via a switch control unit in a power control unit in the socket adapter;
providing a plug adapter with signal generation capability connected to the plug;
   responsive to establishing a physical connection between the plug and the socket, the socket adapter and the plug adapter utilizing respective signal generation capabilities to establish a handshake protocol between the socket adapter and plug adapter across the established physical connection, wherein the socket adapter comprises a power converter of the power control unit for converting the AC power to a direct current (DC) power in response to the AC power being turned off by the switch, wherein, prior to performing the handshake protocol, the socket adapter provides the DC power across the established physical connection to power a communications unit in the plug adapter in order for the plug adapter to perform the handshake protocol; and
   responsive to a successful handshake protocol between the socket adapter and plug adapter, the switch control unit in the power control unit of the socket adapter instructing the switch to turn on AC power at the socket thereby providing AC power from the socket through the established physical connection to the connected plug.

8. The data processing system of claim 7 wherein the handshake protocol includes the socket adapter sending a first electrical signal, the plug adapter detecting the first electrical signal, the plug adapter sending a second electrical signal in response to the first electrical signal, and the socket adapter detecting the second electrical signal.

9. The data processing system of claim 8 wherein the second electrical signal is a hashed form of the first electrical signal and wherein the socket adapter verifies the second electrical signal as part of the handshake protocol.

10. The data processing system of claim 7 wherein the DC power is not adequate to power an alternating current based electrical appliance, and wherein full (AC) power is turned on from the socket to the plug across the established physical connection by the switch in the socket adapter in response to a successful handshake protocol across the established physical connection.

11. The data processing system of claim 10 wherein the plug is physically connected to the socket through the plug adapter; and wherein the electrical appliance does not have handshake protocol capability.

12. The data processing system of claim 10 wherein the socket adapter is built into an AC based outlet containing the socket.

13. A computer usable program product comprising a non-transitory computer usable storage medium including computer usable code for use in controlling power emission from a socket to a plug coupled to a load, the computer usable program product comprising code for performing the steps of:
   responsive to providing a socket adapter with signal generation capability connected to the socket with alternating current (AC) power turned off at the socket by a switch via a switch control unit in a power control unit in the socket adapter and responsive to providing a plug adapter with signal generation capability connected to the plug, and responsive to establishing a physical connection between the plug and the socket, the socket adapter and the plug adapter utilizing respective signal generation capabilities to establish a handshake protocol between the socket adapter and plug adapter across the established physical connection, wherein the socket adapter comprises a power converter of the power control unit for converting the AC power to a direct current (DC) power in response to the AC power being turned off by the switch, wherein, prior to performing the handshake protocol, the socket adapter provides the DC power across the established physical connection to power a communications unit in the plug adapter in order for the plug adapter to perform the handshake protocol; and
   responsive to a successful handshake protocol between the socket adapter and plug adapter, the switch control unit in the power control unit of the socket adapter instructing the switch to turn on AC power at the socket thereby providing AC power from the socket through the established physical connection to the connected plug.

14. The computer usable program product of claim 13 wherein the handshake protocol includes the socket adapter sending a first electrical signal, the plug adapter detecting the first electrical signal, the plug adapter sending a second electrical signal in response to the first electrical signal, and the socket adapter detecting the second electrical signal.

15. The computer usable program product of claim 14 wherein the second electrical signal is a hashed form of the first electrical signal and wherein the socket adapter verifies the second electrical signal as part of the handshake protocol.

16. The computer usable program product of claim 13 wherein the DC power is not adequate to power an alternating current based electrical appliance, and wherein full (AC) power is turned on from the socket to the plug across the established physical connection by the switch in the socket adapter in response to a successful handshake protocol across the established physical connection.

17. The computer usable program product of claim 16 wherein the plug is physically connected to the socket through the plug adapter; and wherein the electrical appliance does not have handshake protocol capability.

18. The computer usable program product of claim 16 wherein the socket adapter is built into an AC based outlet containing the socket.

\* \* \* \* \*